Dec. 5, 1944.  F. W. SEECK  2,364,393
GEARLESS VARIABLE SPEED TRANSMISSION
Filed Aug. 18, 1943  7 Sheets-Sheet 1

FERDINAND. W. SEECK
INVENTOR

BY *Geisler and Geisler.*
ATTORNEYS

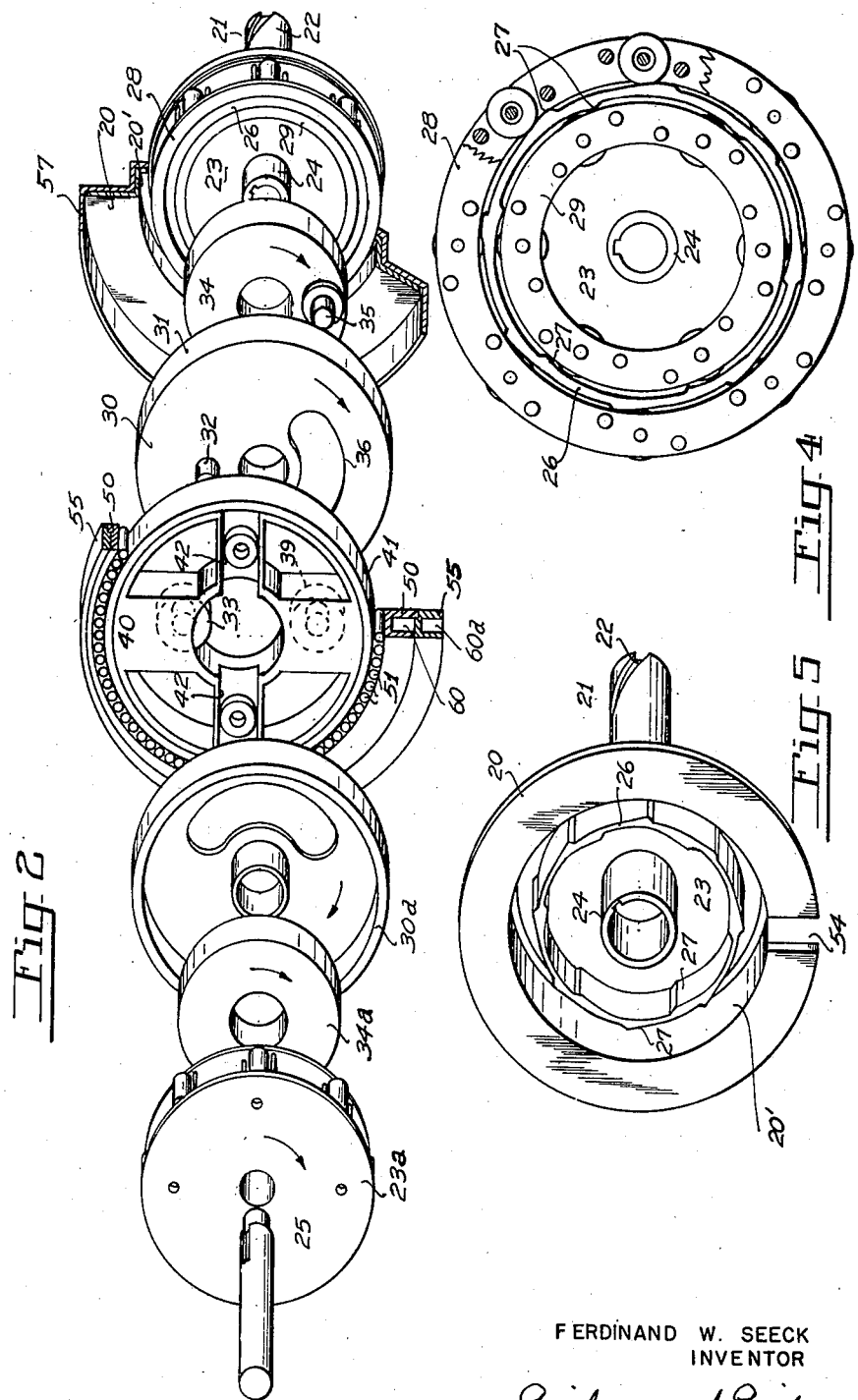

Dec. 5, 1944. F. W. SEECK 2,364,393
GEARLESS VARIABLE SPEED TRANSMISSION
Filed Aug. 18, 1943 7 Sheets-Sheet 3
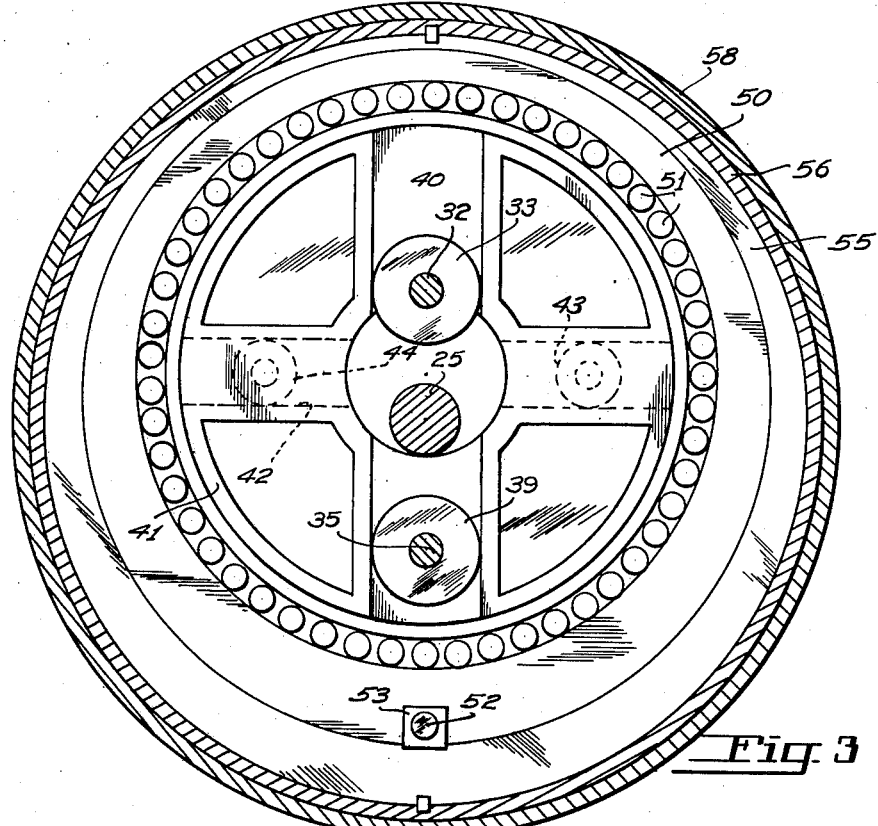
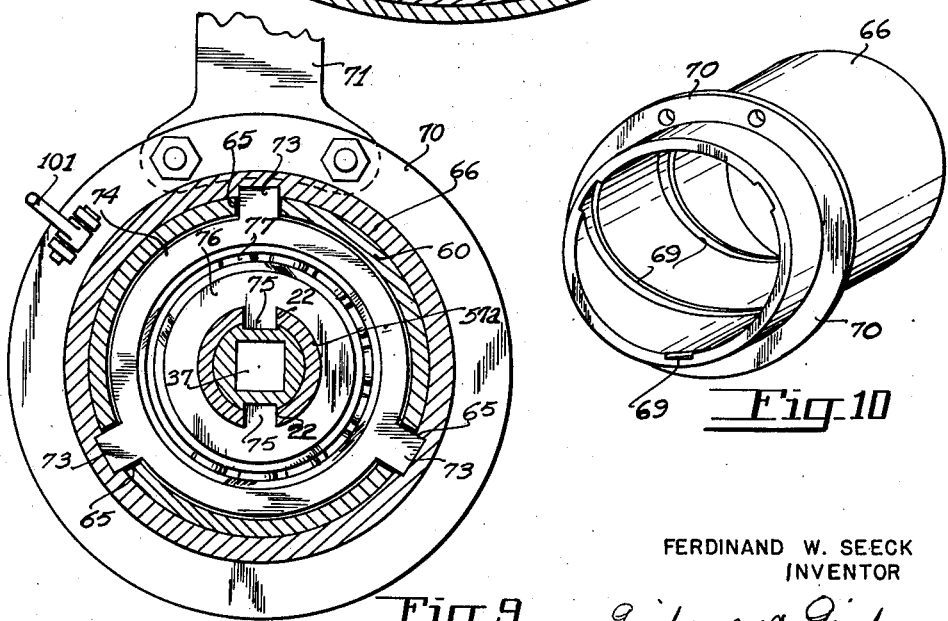
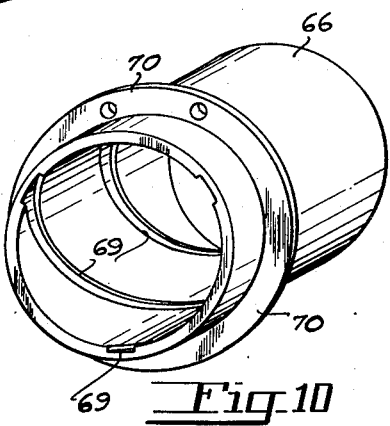
FERDINAND W. SEECK
INVENTOR
BY Geisler and Geisler
ATTORNEYS Dec. 5, 1944.  F. W. SEECK  2,364,393
GEARLESS VARIABLE SPEED TRANSMISSION
Filed Aug. 18, 1943  7 Sheets-Sheet 4

FERDINAND W. SEECK
INVENTOR

BY Geisler and Geisler
ATTORNEYS

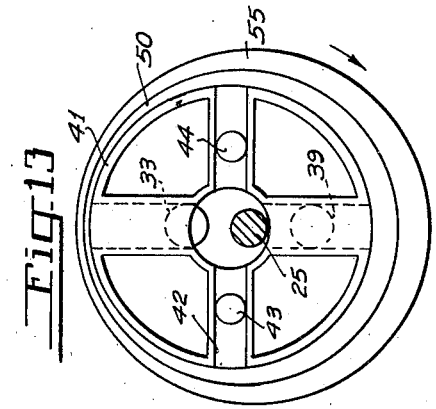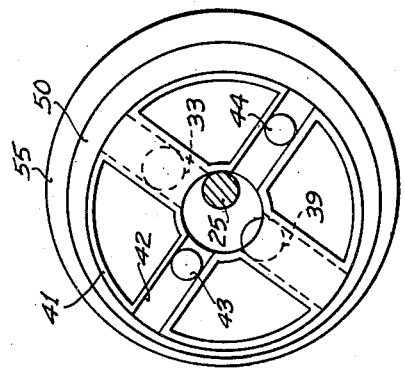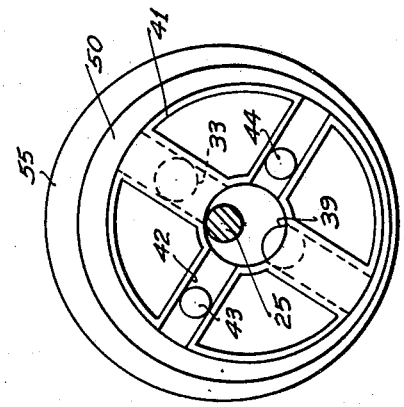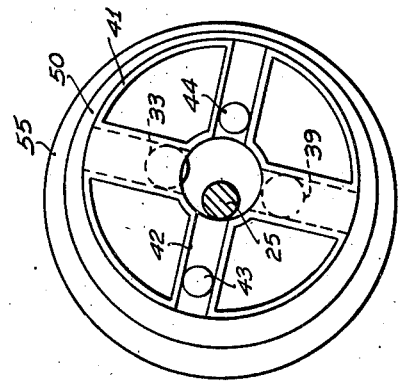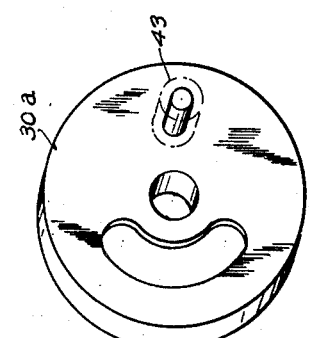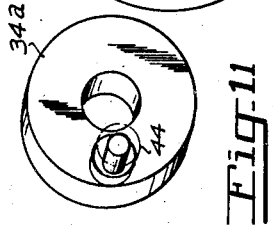

Dec. 5, 1944.   F. W. SEECK   2,364,393
GEARLESS VARIABLE SPEED TRANSMISSION
Filed Aug. 18, 1943   7 Sheets-Sheet 6

FERDINAND W. SEECK
INVENTOR

BY *Geisler and Geisler*
ATTORNEYS

Dec. 5, 1944.　　　　F. W. SEECK　　　　2,364,393
GEARLESS VARIABLE SPEED TRANSMISSION
Filed Aug. 18, 1943　　　7 Sheets-Sheet 7.
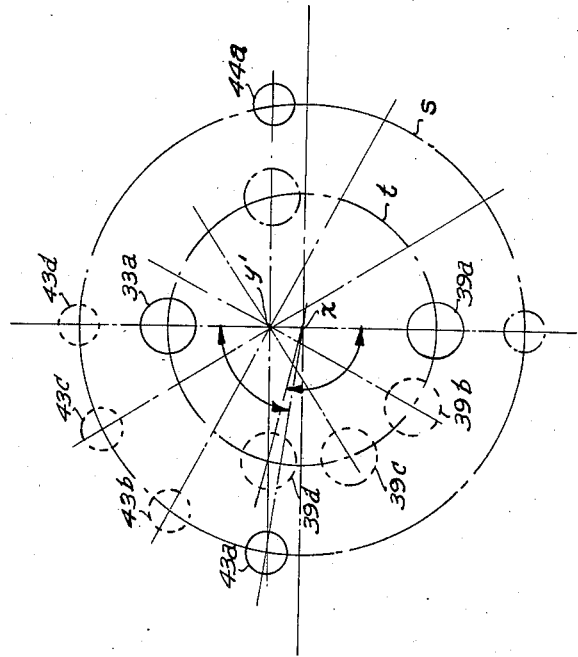
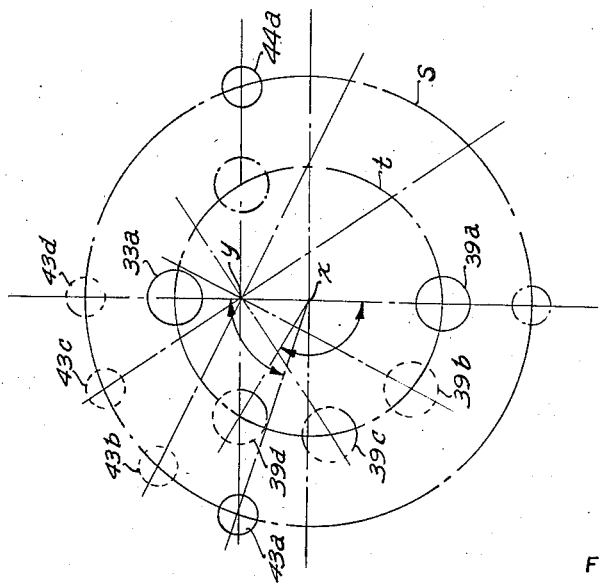
FERDINAND W. SEECK
INVENTOR
BY *Geisler and Geisler*
ATTORNEYS Patented Dec. 5, 1944

2,364,393

UNITED STATES PATENT OFFICE 2,364,393

GEARLESS VARIABLE SPEED TRANSMISSION

Ferdinand W. Seeck, Lebanon, Oreg.

Application August 18, 1943, Serial No. 499,035

11 Claims. (Cl. 74—69)

This invention relates in general to gearless transmissions in which variations in speeds between driving and driven members are provided for, and, more specifically, relates to a controllable variable speed transmission of the type described in my United States Letters Patent No. 2,085,770, issued July 6, 1937, to which reference should be made.

An object of the present invention is to provide an improved gearless transmission by means of which controllable variable speeds can be imparted to driven mechanism without discontinuing the transmission of power by the driving mechanism.

Another object is to provide a gearless transmission of a type somewhat similar to that described in my above-mentioned patent, which will operate in a similar manner and with the same efficiency as the device of said patent, but which will be simpler in construction and easier to manufacture.

A still further object of this invention is to provide such a device in which the individual members of the driving portion will be more or less duplicates of corresponding members in the driven portion of the mechanism, thus further simplifying the construction of the device.

The manner in which these and other objects are attained through the present invention will be brought out in the following description in connection with the accompanying drawings.

In the drawings:

Fig. 2 is an isometric view of the essential elements of the same transmission shown dissembled but in relative positions, one to the other;

Fig. 3 is a sectional end elevation of the transmission corresponding to line 3—3 of Fig. 1;

Fig. 4 is an end elevation of the cam flange of one of the driven members showing the adjacent roller assemblies in position for engagement of the rollers with the cam surfaces;

Fig. 5 is an isometric view, drawn to a smaller scale, of the driven member cam flange, said member being shown in place within a driving unit;

Fig. 9 is a sectional end elevation of the speed changing unit corresponding to line 9—9 of Fig. 1;

Fig. 10 is an isometric view of the manually operable speed changing cam;

Figure 19:
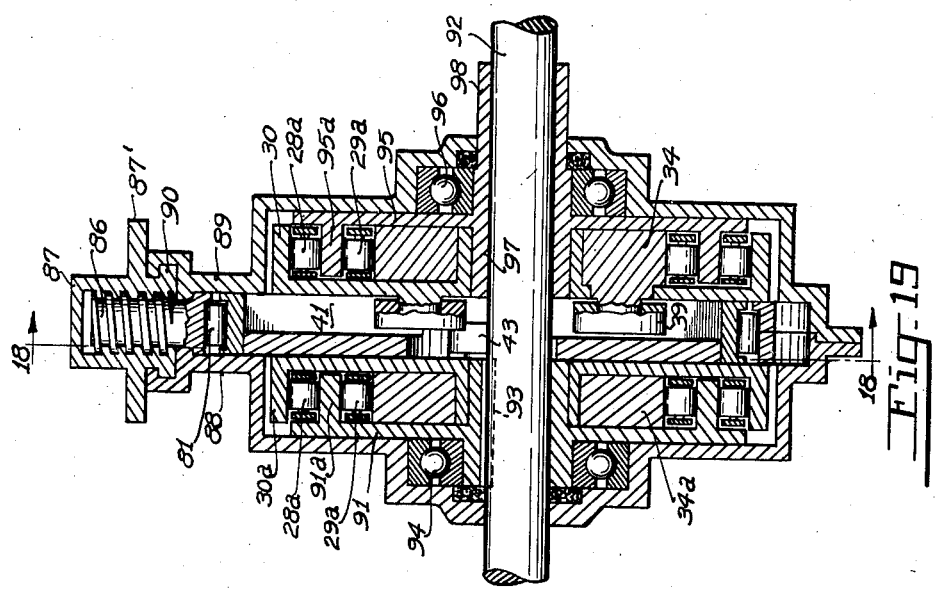
Figure 18:
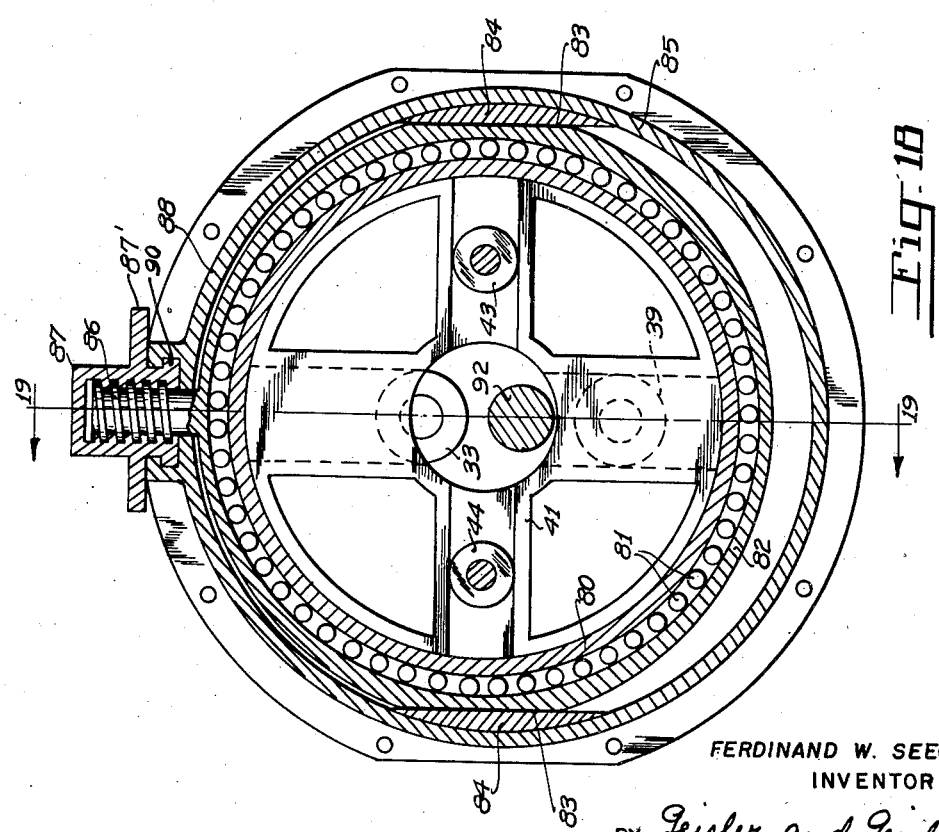

Figs. 11 and 12 are isometric views of members 30a and 34a respectively of Fig. 2, showing their opposite faces;

Figs. 13 to 17 inclusive are diagrammatic illustrations of the operation of the device when the device is arranged in the manner shown by the preceding figures;

Figs. 18 and 19 illustrate a modified form in which my invention may be made, Fig. 18 being a sectional front elevation of the transmission corresponding to line 18—18 of Fig. 19, and Fig. 19 being a sectional side elevation of the transmission corresponding to line 19—19 of Fig. 18; and Figs. 20 and 21 are further diagrammatic illustrations of the manner of operation of my invention.

The essential elements of the device comprise, primarily, a duplicate set of disc cranks, concentrically mounted with relation to the axis of the driving and driven units, an intermediate coupling member, and means for causing axial displacement of the coupling member so as to vary the speed ratio between the driving and driven shafts.

One of the salient features of the transmission is that the ratio may be changed while the transmission continues to operate, whether or not under load, and that the speed variations within the speed ratio range are almost limitless. This is due to the fact that the driving and driven units are always connected and that the speed ratio between them is determined by the extent of displacement of the coupling member. Another feature is that the power impulses are constant.

Referring first to Figs. 1, 2, 4, 5 and 6, a driving drum 20, (see particularly Figs. 5 and 6), has an axial shaft 21 extending from one end thereof. The shaft 21 has a pair of spiral key slots 22 on its periphery, the purpose of which will be explained later.

A second and smaller drum 23 is freely mounted within the drum 20, in axial alinement therewith, and has a hub 24 which is keyed to the driven shaft 25. The smaller drum 23 has a peripheral flange 26 which is formed with a plurality of cam surfaces 27 upon its inner and outer peripheries (see Figs. 4 and 5) which cooperate with the roller assemblies 28 and 29. A disc crank 30 is concentrically mounted within the drum 20 and mounted for rotation on the hub 24 of the drum 23. The disc crank 30 has an outer peripheral flange 31 that fits within the peripheral flange 20' of drum 20 but is sufficiently spaced therefrom to permit freedom of rotation with respect to the drum 20. A crank pin 32 extends from the face of the disc crank and a roller 33 is journalled thereupon.

Figure 7:
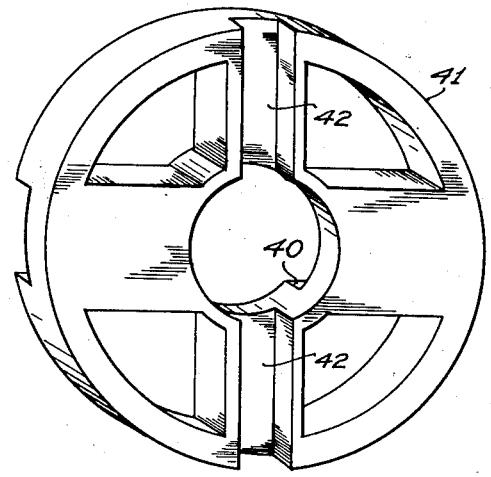
Fig. 7 is an isometric view of the intermediate coupling member showing the face opposite to that shown in Fig. 2.

A second and smaller disc crank 34 is in turn journalled upon the hub of disc crank 30 and is smaller in diameter than the flange 26 of drum 23. A crank pin 35 (Fig. 2) extends from the face of disc crank 34 through an elongated arcuate slot 36 in the face of disc crank 30 and a roller 39 (Fig. 1) is journalled on the crank pin 35. The radial distance of the crank pins 35 and 32 from the axis of rotation of the disc cranks is made the same. The roller assembly 28 is disposed between the circumferential flanges 26 and 31 of drums 23 and 30 respectively and the roller assembly 29 is disposed between circumferential flange 26 of drum 23 and the outer circumference of disc crank 34 (see Figs. 1 and 6). The rollers 33 and 39 of disc cranks 30 and 34 respectively engage within radial slots or channels 40 of an intermediate coupling member 41 (see also Fig. 7). The coupling member 41 may be adjusted eccentrically with relation to the axes of the driving and driven members, thus changing the position of the rollers 33 and 39 in the slots 40 in relation to the axis of the coupling member. The manner of adjustment will be described subsequently.

Another pair of radial slots 42 are disposed in the opposite face of the coupling member 41 (see Fig. 2) and are located at right angles to the slots 40. The slots 42 engage rollers 43 and 44 (see Figs. 3, 11 and 12) on crank pins of disc cranks 30a and 34a which are similar in structure to disc cranks 30 and 34 respectively. They are arranged in the assembly so that the faces from which the crank pins extend are opposite to those of cranks 30 and 34, i. e., the crank pin faces of each pair are adjacent.

A drum 23a is secured to the housing plate 48 and has a circumferential flange 26a and cam surfaces thereupon corresponding to the flange 26 and cam surfaces 27 of the driven drum 23. However, the cam surfaces of the stationary drum 23a are inclined in the opposite direction from those of driven drum 23, the reason for which will be explained later.

It should be noted that the disc cranks 30a and 34a are journalled concentrically upon the hub 24a of the stationary drum 23a corresponding to the journalling of disc cranks 30 and 34 upon the hub 24 of driving drum 23.

The driven shaft 25 is journalled at its inner end within a roller bearing 46, which bearing is disposed within a cylindrical bore in the main driving drum 20 and is journalled also in a ball bearing 47 in the housing end plate 48. The driving and driven shafts are axially alined and the driving and driven units are concentrically mounted relative to the two shafts. The coupling member 41 is mounted between the disc cranks 30 and 34 on one side and 30a and 34a on the other side and is adapted for eccentric adjustment relative to the axis of the disc cranks.

Figure 1:
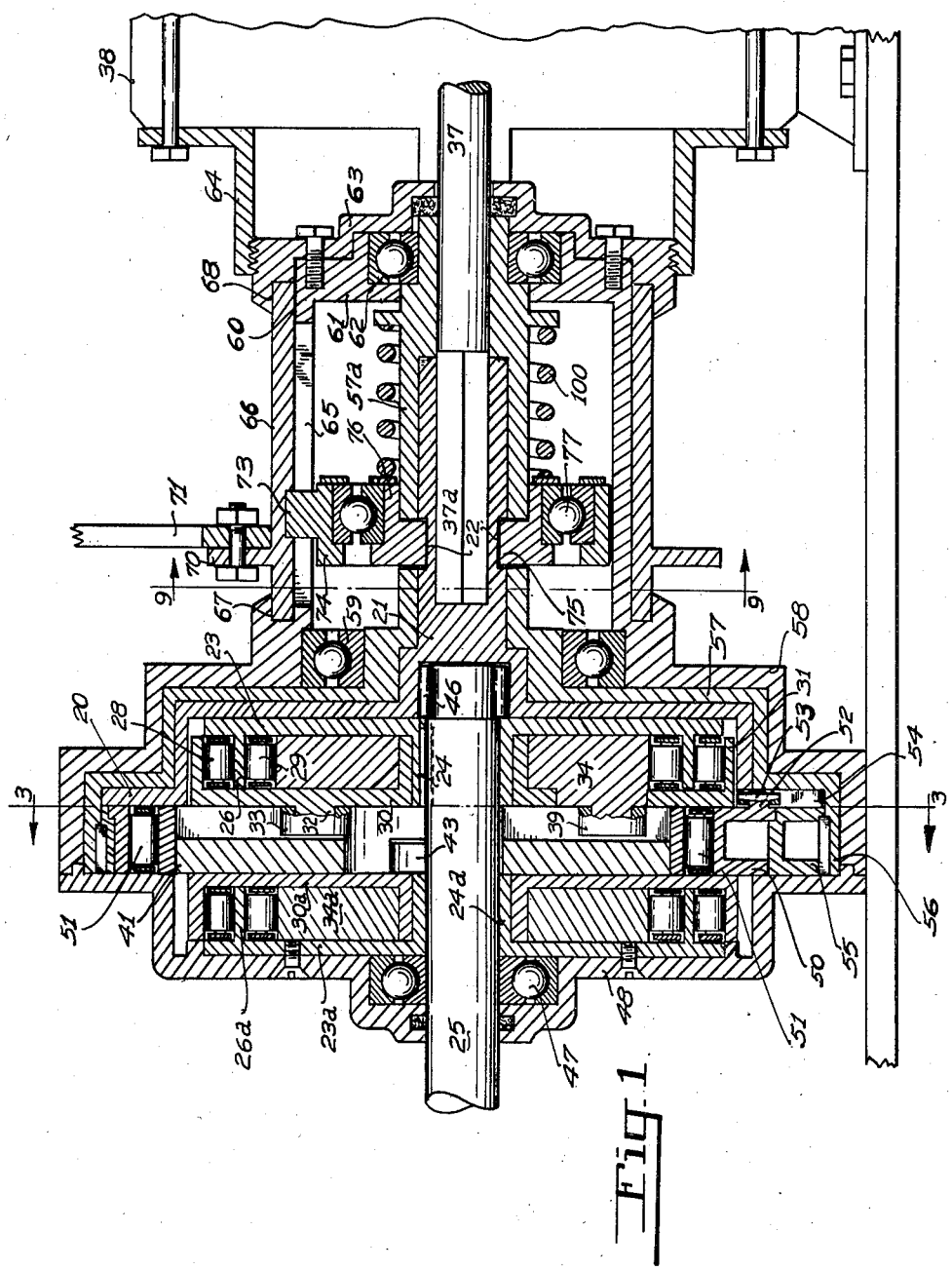
Fig. 1 is a sectional side elevation of the assembled transmission, showing one form in which my invention can be carried out.
Figure 6:
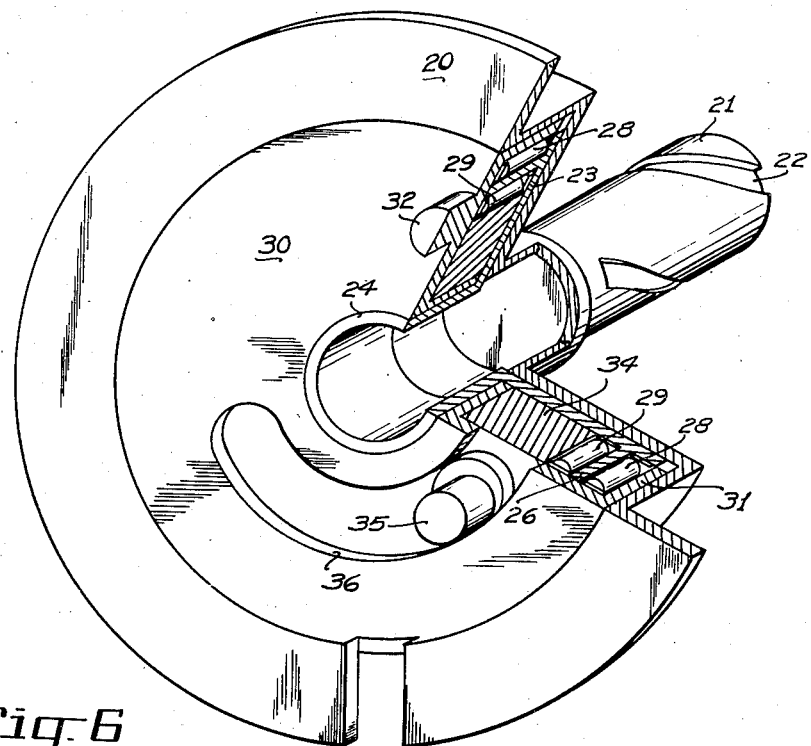
Fig. 6 is an isometric view of the members located to the right in Fig. 2, showing these in assembled position, with a portion cut away to show more clearly the arrangement of the individual members.

The hub 21 of the driving drum 20 is rigidly connected to the shaft 37 of a suitable prime mover 38, as shown at 37a (Fig. 1).

Figs. 2 and 3 best show the manner in which the coupling member is mounted. The coupling member 41 is journalled within an eccentric ring shaped cam 50 and bears upon a series of bearing rollers 51 and race disposed between the outer periphery of the coupling member and the inner surface of the ring eccentric 50.

A pin 52 (Figs. 1 and 3), extends from one face of the ring eccentric 50 and a collar 53 is journalled thereupon which engages with a radially extending cut-out portion 54 in the outer flange of the driving drum 20 (Figs. 1, 5 and 6), effecting a locked rotational relation between the ring eccentric 50 and drum 20.

The ring eccentric 50 is rotatably disposed within an outer ring eccentric 55 (Fig. 3) which is fixedly secured within the outer peripheral flange 56 of an adjusting drum 57. The inner ring eccentric 50 and outer ring eccentric 55 are both relieved on the thick side, as shown at 60 and 60a (Fig. 2), in order to provide dynamic balance, since they are rotated with the driving shaft when the transmission is operating. The driving drum 20 is rotatably disposed within the adjusting drum 57 and its hub 57a, thus providing for rotational adjustment of the outer ring eccentric with respect to the inner ring eccentric. The adjusting drum 57 in turn is rotatably disposed within the transmission housing 58, being journalled upon a ball bearing 59.

By means of a control mechanism, about to be described, the adjusting drum 57 and therewith the outer ring eccentric 55, may be rotated in order to shift the inner ring eccentric 50 and thereby move the coupling member 41 into or out of axial alinement with the driving and driven shafts. Fig. 17 shows the coupling member 41 moved into such axial alinement and Figs. 3 and 13 show member 41 moved out of such axial alinement.

A cylindrical extension 60 of the transmission housing 58 (Fig. 1) has an end plate 61, which is provided with an antifriction bearing 62, in which the end of the hub 57a of the adjusting drum hub 57 is journalled. The end plate 61 is secured to a flanged ring 63 which in turn is threadably engaged with a large boss 64 on the housing of the prime mover 38. The cylindrical extension 60 is formed with three, symmetrically-spaced longitudinal slots 65 which extend nearly the length of the cylindrical extension 60 (see also Fig. 9). While a greater or less number of such slots may be provided, I have found the three slots, as shown, to be very satisfactory.

An outer adjusting cylinder 66 (see Figs. 1, 9 and 10) encompasses the cylindrical extension 60 and is rotatably supported in grooves 67 and 68, which grooves also prevent longitudinal or axial movement of this adjusting cylinder. The adjusting cylinder has three, equally-spaced spiral grooves 69 on its inner surface, the number of grooves corresponding to the number of slots 65. An annular flange 70 (Figs. 1 and 9) has a handle 71 secured thereto.

Figure 8:
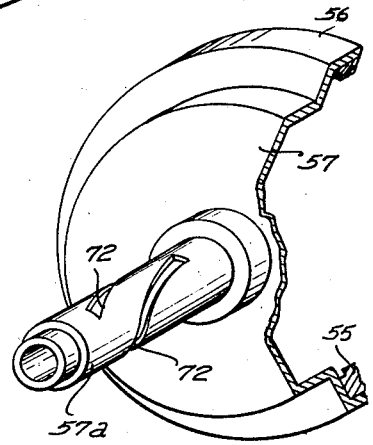
Fig. 8 is an isometric view of one of the adjusting members for positioning the intermediate coupling member whereby speed change is controlled.

The hub 57a of the adjusting drum 57 has a pair of equally-spaced spiral slots 72 (see Fig. 8) which extend through the hub. These extend in an opposite direction from the grooves 22 of the hub 21 of the drum 20. The longitudinal slots 65 of the stationary cylindrical extension 60 and the spiral grooves 69 of the adjusting cylinder 66 are engaged by the lugs or keys 73 of a spline ring 74 (see Figs. 1 and 9), and the spiral grooves 22 of the hub 21 of the drum 20 and the oppositely extending spiral slots 72 of adjusting drum hub 57a are engaged by lugs or keys 75 of a smaller spline ring 76. Suitable bearings 77 permit rotation of the smaller ring 76 inside the larger ring 74 but longitudinal movement of the larger ring causes similar longitudinal movement of the smaller ring.

When the adjusting cylinder 66 is rotated by the handle 71 the larger or outer spline ring 74, by virtue of its engagement with the spiral grooves 69, will be moved longitudinally, since the longitudinal slots 65 of the stationary cylinder 66 prevent rotation of the ring 74. Such longitudinal movement of the outer spline ring 74 produces similar longitudinal movement of the inner spline ring 76. But longitudinal movement of the inner spline ring 76 will cause the hub 57a and hub 21 to be rotated with respect to each other, and thus rotation of adjusting drum 57 with respect to the driving drum 20; and, since the ring eccentric 55 is fixedly secured to the adjusting drum 57 while the ring eccentric 50 is connected to the drum 20, through engagement of the cam roller 53 with slot 54, rotation of the adjusting drum 57 with respect to the drum 20 will move the coupling member 41 into or out of axial alinement.

In Fig. 1 the spline rings 74 and 76 and the ring eccentrics 50 and 55 are shown in the position which they occupy when the coupling member 41 is moved to extreme eccentric position. Rotation of the adjusting cylinder 66 so as to cause the spline rings 74 and 76 to move towards the right (as viewed in Fig. 1) will cause the coupling member 41 to be moved correspondingly towards concentric position.

Under some circumstances, particularly when there is a heavy load on the driven shaft 25, the corresponding tendency for the coupling member 41 to move into less eccentric position might be sufficient to produce some movement of the spline rings 74 and 76 unless the adjusting cylinder 66 is held against rotation. However, such holding means can be provided in the form of a latch 101 (Fig. 9) mounted on the flange 70 of the adjusting cylinder 66 and adapted to engage suitable notches (not shown) on the perimeter of the housing 58. Furthermore a coil spring 100 (Fig. 1) may be located on the adjusting drum hub 57a to exert a force sufficient under normal conditions to hold the spline ring 76, and with it the spline ring 74, in the position set to maintain the coupling member 41 in the desired eccentric position. It is also possible in the construction shown in Fig. 1, to dispense entirely with the adjusting handle 71 and the locking latch 101 (Fig. 9), and have the adjusting of the eccentric position of the coupling member 41 automatically controlled by the coil spring 100 in response to the load on the driven shaft. Under such arrangement the coil spring 100 would have sufficient force to move the adjusting members to cause the coupling member 41 to be made to assume extreme eccentric position, but, if the load on the driven shaft were sufficiently heavy, the tendency of the coupling member to take a less eccentric position would be sufficient to produce movement of the spline ring 76 against the force of spring 100 until a balance would be obtained. Since such movement of the coupling member, as will be apparent later, reduces the speed and consequently increases the power imparted to the driven shaft, the coil spring 100 can be made to act within certain predetermined limits to produce automatic adjustment of the coupling member into or out of axial alinement.

From Figs. 2, 4 and 5 it will be apparent that rotation of either disc crank 30 or 34 in clockwise direction (that is, in the direction indicated by the arrows in Fig. 2) will produce corresponding rotation of the drum 23 because of the wedging of the rollers in the roller assemblies 28 or 29 respectively with the cam surfaces of the flange 26 of drum 23. However opposite rotation of disc cranks 30 or 34 would not produce opposite rotation of drum 23. Since the cam surfaces of the flange 26a of the drum 23a are inclined in the opposite direction disc cranks 30a and 34a are free to rotate in clockwise direction but cannot rotate in counter-clockwise direction (as viewed in Fig. 2) without engaging the flange 26a and drum 23a, and in this particular form of my invention, drum 23a is secured to housing plate 48 and cannot be rotated. Thus disc cranks 30a and 34a are free to move in clockwise direction only, while disc cranks 30 and 34 may freely move counter-clockwise, but when moving clockwise produce clockwise rotation of drum 23 and therewith of the driven shaft 25 to which drum 23 is keyed.

Referring now to the diagrammatic Figs. 13 to 16 inclusive, the operation of the transmission when the coupling member 41 has been moved out of axial alinement will be described. Let it be assumed that the driving shaft, and with it driving drum 20, adjusting drum 57 and ring eccentrics 50 and 55, are all being rotated clockwise as viewed in Figs. 2 and 13. The action of the disc cranks 30a and 34a under such condition will first be considered. As the driving drum and ring eccentrics rotate in the direction indicated by the arrow in Fig. 13, the center of the coupling member 41 will follow a circular path about the axis of the driving shaft. When the driving drum and ring eccentrics are rotated clockwise from their position in Fig. 13 to that of Fig. 14, the center of coupling member 41 is moved slightly to the right and slightly downward from its position in Fig. 13. When the coupling member 41 moves downward it tends to move the disc crank rollers 43 and 44 downward. Movement of disc crank roller 43 downward would require disc crank 30a to rotate counter-clockwise, but this is impossible since disc crank 30a can rotate only in a clockwise direction, as previously explained. Movement of the disc crank roller 44 downward causes disc crank 34a on the other hand to rotate clockwise which disc crank 34a is free to do. Thus, when the center of the coupling member 41 moves downwardly, the roller 44 moves downwardly but roller 43 does not move. The result of this is to force the coupling member 41 to rotate clockwise from the position in Fig. 13 to some such position as shown in Fig. 14. The center of the coupling member 41 continues to be moved downwardly but to the left when the driving drum and ring eccentrics rotate from the position in Fig. 14 to that of Fig. 15, and during this period roller 43 continues to hold while roller 44 continues its clockwise movement. Consequently during this latter period the coupling member 41 is forced to turn further in clockwise direction.

After passing the position in Fig. 15 the center of the coupling member 41 is moved upwardly. Roller 44 cannot move upwardly, since that would cause disc crank 34a to move counter-clockwise, which is impossible. Consequently roller 44 now holds firm but roller 43, on the other hand, now moves upwardly since this causes movement of disc crank 30a clockwise instead of counter-clockwise. During this period from Fig. 15 to Fig. 16 coupling member 41 thus continues to be forced to turn clockwise, and this situation continues as the center of the coupling member continues to be moved upwardly. Then when the center of the coupling member again starts to move downwardly the cycle is repeated.

From these illustrations it is apparent that, as the driving drum and ring eccentrics of the transmission rotate clockwise, the coupling member 41, provided it is off center, is also rotated clockwise, but at a different rate of speed, and the rollers 43 and 44 hold alternately and thus alternately force the coupling member to rotate.

Returning now to Fig. 13, as the coupling member 41 is moved and rotated from the position shown in Fig. 13 to that of Fig. 14, the rollers 33 and 39 will be moved in clockwise direction and with them their disc cranks 30 and 34. If either disc crank 30 or 34 turns in clockwise direction it will drive the drum 23 and therewith the shaft 25, clockwise. Thus the drum 23 operates as a driven clutch member or disc driven by its associated members or disc cranks 30 and 34. If both disc cranks 30 and 34 are turning clockwise at different rates of speed, whichever one is turning the faster at that particular moment will drive the drum 23 and shaft 25 at that particular speed. But since the rollers 33 and 39 are the same radial distance from the axis of rotation of the disc cranks, and since the axis of rotation of the coupling member 41 is eccentric with respect to the axis of rotation of the disc cranks, the two rollers 33 and 39 will not be moved at the same rate of speed, but one will alternately be moved faster than the other.

It can be shown by proof similar to that explained at length in my United States Patent No. 2,085,770, above referred to that the speeds of the two rollers 33 and 39 alternately increase and decrease between the moments when their speeds are equal, the roller of the driving disc crank first increasing in speed and then decreasing in speed while the speed of the other roller first decreases and then increases. However, it will also be found that the speed of rotation of the coupling member 41, caused by the alternate holding of the rollers 43 and 44, as previously explained, creases and increases alternately.

The result of these two variable cooperating forces, namely the forcing of the rotation of the coupling member, and the driving by the coupling member of the disc cranks 30 and 34 with varying speeds produces a composite rotation movement of the driven drum 23 and shaft 25 at a constant speed as long as the relative eccentric position of the coupling member 41 is not changed.

Should the coupling member 41 be brought into concentric position with respect to the axis of driving and driven shafts, such as the position illustrated in Fig. 17, there will be no such forced rotation of the coupling member. Thus when in such concentric position the coupling member will not be rotated at all and no driving of the shaft 25 will occur.

The speed at which the driven shaft is rotated, through the medium of this transmission, will depend upon the extent to which the coupling member 41 is moved out of axial alinement, and any desired speed is obtainable from zero up to the maximum speed ratio provided by the extreme eccentric position.

Thus with the improved device which I have illustrated and described I am able to accomplish the desired results and the same results which I attain with the device in my United States Patent No. 2,085,770, but the device of the present invention, with its simplified construction and with the corresponding members in both driving and driven sections being similar, is an improvement over my former device and is, I have found, more practical for use, especially with a stationary mounted motor or prime mover.

The form of transmission shown in Figs. 18 and 19 differs from that previously described in the arrangement of driving and driven shafts and in the means provided for positioning the coupling ring and thereby effecting speed change adjustment. The driving and driven shafts extend from the same side of the transmission and the driving and driven means, such, for example, as pulleys (not shown), are positioned upon their respective shafts in adjacent relation.

The coupling member 41, employed in this transmission, is identically the same as previously described. The coupling member is rotatably mounted by means of bearing rollers 81 disposed between an inner bearing race 80 and an outer bearing race 82. The outer bearing race is slidably mounted inside the transmission housing for movement in a plane perpendicular to the transmission axis. The outer bearing race is formed with diametrically opposed parallel flat surfaces 83 on its outer periphery which slidably engage with filler segments 84 secured to the inner periphery of the housing 85. A threaded stem 86 extends from the outer periphery of the outer bearing race 82 in parallel relationship to the flat surfaces 83. The stem 86 engages a threaded adjusting collar 87 which is rotatably secured between the halves 88 and 89 of the transmission housing. Axial movement of the collar 87 is prevented by a circumferential flange 90 which engages a complementary groove in the housing halves. A suitable handle (not shown), may be provided on the collar 87, if desired, to facilitate the turning of the collar in adjusting the position of the coupling member 41. Ordinarily this will not be necessary since the collar may easily be turned by grasping the outer perimeter 87' which is preferably knurled.

The driving drum or clutch member or disc 91 is secured to the driving shaft 92 by suitable means such as the key 93, and the drum 91 is journalled within the transmission housing section 88 by the antifriction bearing 94. The driving drum 91 has a peripheral flange 91a which is formed with a plurality of cam surfaces upon its inner and outer peripheries similar to flange 26 of drum 23 (Fig. 4). The driving disc crank 30a (Fig. 12) is journalled on the hub of drum 91. The driving disc crank 34a (Fig. 11) is journalled on the hub of disc crank 30a, as previously described. Roller assemblies 28a and 29a, identical to those previously described, are located between the cam surfaces of flange 91a and the center peripheral surface of disc crank 30a and outer peripheral surface of disc crank 34a respectively. The cam surfaces of flange 91a are so arranged as to cause disc cranks 30a and 34a to be driven in clockwise direction (looking from left to right in Fig. 19) by the drum 91 when the latter is rotated clockwise but to permit either of the disc cranks 30a or 34a to be independently rotated faster than drum 91 in clockwise direction.

The driven drum or clutch member or disc 95 is journalled within the transmission housing section 89 by anti-friction bearing 96, and has elongated hubs 97 and 98 extending in axially opposite directions. The drum 95 has a peripheral flange 95a formed similarly with cam surfaces on its inner and outer peripheries, but extending in opposite direction from the cam surfaces of flange 91a. Driven disc crank 30 (Fig. 2) is journalled on the hub 97 of drum 95, and the driven disc crank 34 (Fig. 2) is journalled on the hub of disc crank 30, while further roller assemblies 28a and 29a are positioned in the same manner as previously described. The hub portion 98 of drum 95 extends outwardly through the housing and moves a power transmitting member, such as a pulley (not shown), secured thereto. The bore of the hub portion serves as a bearing for the driving shaft 92.

The operation of this device will be readily understood from the previous explanation. The method of operation is similar except that the disc cranks 30a and 34a do not alternately hold but instead act alternately as direct driving members to rotate the coupling member. When the coupling member is concentric with the disc cranks and thus with the axis of the transmission, the driving and driven members all rotate in unison. When the coupling member is moved into eccentric position the speed ratio between the driving and driven shafts is changed and the driven shaft is rotated more rapidly depending upon the eccentric position of the coupling member. The operation of the transmission, when the coupling member is in eccentric positions, is illustrated diagrammatically in Figs. 20 and 21.

Referring to Fig. 20, $x$ is assumed to be the axis of the transmission and thus the center of rotation of the driving and driven disc cranks. The axis of rotation of the coupling member is assumed to be at $y$. The driving cranks are indicated by 43a and 44a and the driven cranks by 33a and 39a. The driving cranks 43a and 44a follow a circular path $s$ in clockwise direction about the center $x$ and the driven cranks 33a and 39a similarly follow a concentric circular path in clockwise direction indicated by the circle $t$.

Starting from the full line position shown in Fig. 20, let it be assumed that the driving cranks 43a and 44a (of the driving discs 30a and 34a respectively) begin to be rotated in clockwise direction. Since the channels 40 and 42 of the coupling member (Fig. 7) are at right angles to each other the driven crank 39a will be forced to move to the corresponding positions 39b, 39c, and 39d, when the driving crank 43a moves to the positions 43b, 43c and 43d consecutively. The angles 43b—$y$—39b and 43c—$y$—39c and 43d—$y$—39d will always be equal. However, when the driving crank 43a moves through the arc measured by the angle 43a—$x$—43d the driven crank 39a is forced to move through the arc measured by the angle 39a—$x$—39d, and since the latter central angle is greater the arc which is measured thereby is greater. In other words, the driven crank 39a is forced to be rotated at greater speed. At the same time driven crank 33a is moved through a shorter arc, as apparent from Fig. 20 and driving crank 44a is simultaneously moved through a longer arc, but, due to the nature of the engaging cam surfaces previously explained, crank 44a may move faster than driving drum 91 and similarly driven crank 33a can move more slowly than driven drum 95. (Neither of the driving cranks 43a or 44a can move more slowly than drum 91, and neither of the driven cranks 33a or 39a can move faster than driven drum 95). During the interval which has just been described with reference to Fig. 20 the crank 43a does the driving of the coupling member. Rotation of the coupling member causes the crank 44a to move ahead faster than the driving drum 91, which crank 44a is free to do. Rotation of the coupling member causes driven crank 39a, and thereby driven drum 95, to move faster and causes crank 33a to move more slowly than drum 95, which crank 33a is free to do. In other words, during this first interval a driving force is transmitted through the medium of crank 43a, coupling member and crank 39a and cranks 44a and 33a are idling during the period. Similarly it will be apparent that during the next quarter rotation of the coupling member crank 43a continues to drive the coupling member, but crank 33a now drives drum 95 while crank 39a does the idling, and crank 44a continues to idle. Thus the cranks 43a and 44a alternately drive the coupling member and the cranks 39a and 33a alternately act as the medium for imparting rotation, at greater speed, to the drum 95, and the periods of active operation of the two sets of cranks overlap, as shown in Fig. 20, thereby avoiding any possibility of jerky, uneven resulting rotation of the driven drum 95.

In Fig. 21 it is assumed that the coupling member has been moved to a less eccentric position and the center of rotation of the coupling member $y'$ will thus be closer to the axis $x$ of the transmission. Considering the same period of operation as previously described with reference to Fig. 20, it will be noted that when the driving crank 43a now moves through the arc measured by the angle 43a—$x$—43d the driven crank 39a will be moved through the arc measured by the angle 39a—$d$—39d. It is evident from Fig. 21 that there is less difference in size between these angles and consequently in the lengths of the arcs which they measure, and thus the difference between the speeds of the driving and driven shafts is less. It will also be evident from Fig. 21 that when the center of rotation $y'$ of the coupling member coincides with $x$, the coupling member then being in concentric position, the speeds of the driving and driven shafts will be equal. When this occurs all members of the transmission move in unison as previously stated.

Preferably, in my invention the radius of the circle in which the driving cranks move (thus the circle $s$ in Figs. 20 and 21), is considerably greater than the radius of the circle in which the driven cranks move (circle $t$), and this provides better leverage. Not all ratios of these radii length and extreme offcenter positions of the coupling member will result in absolutely uniform speed at all moments in my device, but, as will be obvious from Figs. 20 and 21, there will be a considerable range within which the driven speed produced will either be entirely uniform or so nearly so that any momentary variations cannot be detected. For example, by actual demonstration, I have found that a transmission which has been built in the manner illustrated in Figs. 18 and 19, is capable of producing constant uniform speed with the radius of circle $s$ (Fig. 20) and the radius of circle $t$ having the ratio of 3 to 5 with respect to each other approximately, provided the distance of the center of the coupling member (the point y) from the center axis of the transmission (the point x) does not exceed one-half of the radius of the circle t. Thus it will be noted in Figs. 20 and 21 that when the arcs on the circle s denoting the distance of travel from 43a to 43b, from 43b to 43c, and from 43c to 43d are equal, the arcs on the circle t, denoting the travel of the driven crank from 39a to 39b, from 39b to 39c, and from 39c to 39d, during the corresponding periods, will also be equal. But since the driving crank for the transmission, in the construction of Figs. 18 and 19, will always be moving at uniform speed, provided the power shaft is rotated at uniform speed, the driven crank through which the power is transmitted at that moment will also be rotated at uniform speed, under the conditions described, and thus constant uniform speed at the increased rate is obtained in the driven shaft.

I have also found it preferable to have the rollers on the driven cranks (thus the rollers 33 and 39) larger in external diameter than those of the driving cranks, and consequently the channels 40 of the coupling member 41 are wider than the channels 42 on the opposite side.

Although in the two forms of transmission described and illustrated I have shown peripheral flanges with cam surfaces and cooperating roller assemblies as the clutch means for causing engagement between the disc cranks and their respective drums, other clutch elements might also be employed for this purpose instead of the particular cam flanges described. All that is necessary is to have suitable clutch or engaging elements which will provide the necessary gripping hold between each disc crank and its drum during the predetermined relative rotation in one direction while permitting overrunning or slippage in the opposite relative rotation.

Further modifications in the form of transmission embodying my invention would also be possible within the scope of the invention. It is not my intention to limit my invention otherwise than as set forth in the claims.

I claim:

1. In a gearless variable speed transmission, a pair of disc cranks, a second pair of disc cranks similar to said first mentioned disc cranks respectively, a clutch member cooperating with said first mentioned disc cranks, a second clutch member cooperating with said second pair of disc cranks, said clutch members and their respective disc cranks having cooperating engaging elements, an intermediate coupling member, one of said clutch members and its associated disc cranks located on one side of said coupling member and the other clutch member and its associated disc cranks located on the other side of said coupling member, means on said coupling member for engaging said first mentioned and second mentioned pairs of disc cranks respectively, and means for moving said coupling member into and out of axial alinement with said clutch members and said disc cranks to enable said coupling member to cause variation in the relative speed ratio between said clutch members.

2. In a gearless variable speed transmission, a driving shaft and a driven shaft, a pair of disc cranks, a second pair of driven disc cranks similar to said first mentioned disc cranks, a clutch member cooperatively engaging said first mentioned disc cranks, a driven clutch member cooperatively engaged by said driven disc cranks, said driven clutch member connected with said driven shaft, an intermediate coupling member, one of said clutch members and its associated disc cranks located on one side of said coupling member and the other clutch member and its associated disc cranks located on the other side of said coupling member, means on said coupling member for engaging said first mentioned and driven pairs of disc cranks respectively, and means for moving said coupling member into and out of axial alinement with said clutch members and said disc cranks to enable said coupling member to cause variation in the relative speed ratio between said clutch members.

3. In a gearless variable speed transmission, a driving shaft and a driven shaft in axial alinement, a pair of disc cranks, a pair of driven disc cranks similar to said first mentioned disc cranks respectively, a clutch member cooperatively engaging said first mentioned disc cranks, a driven similar clutch member cooperatively engaged by said driven disc cranks, said second driven clutch member connected with said driven shaft, an intermediate coupling member, one of said clutch members and its associated disc cranks located on one side of said coupling member and the other clutch member and its associated disc cranks located on the other side of said coupling member, means on said coupling member for engaging said first mentioned and driven pairs of disc cranks respectively, said engaging means on said coupling member including a pair of radial channels on one side of said coupling member and another pair of radial channels on the other side of said coupling member, rollers carried by said disc cranks adapted to roll in said channels, and means for moving said coupling member into and out of axial alinement with said clutch members and said disc cranks to enable said coupling member to cause variation in the relative speed ratio between said clutch members.

4. In a gearless variable speed transmission, a driving shaft and a driven shaft, a pair of driving members, a pair of driven members similar to said driving members, a clutch disc cooperatively engaging said driving members, said clutch disc connected with said driving shaft, a second clutch disc cooperatively engaged by said driven members, said second clutch disc connected with said driven shaft, said clutch discs and their respective members having cooperating engaging elements, an intermediate coupling member, one of said clutch discs and its associated members located on one side of said coupling member and the other clutch disc and its associated members located on the other side of said coupling member, means on said coupling member for engaging said driving and driven members respectively, and means for moving said coupling member into and out of axial alinement with said clutch discs and members to enable said coupling member to cause variation in the relative speed ratio between said clutch discs.

5. In a gearless variable speed transmission, a pair of disc cranks, a second pair of disc cranks similar to said first mentioned disc cranks, a clutch member cooperating with said first mentioned disc cranks, a second similar clutch member cooperating with said second pair of disc cranks, said clutch members and their respective disc cranks having cooperating engaging elements, an intermediate coupling member, one of said clutch members and its associated disc cranks located on one side of said coupling member and the other clutch member and its associated disc cranks located on the other side of said coupling member, means on said coupling member for engaging said first mentioned and second mentioned pairs of disc cranks respectively, said engaging means on said coupling member including a pair of radial slots in alinement with each other on one side of said coupling member and another similar pair of alined radial slots on the other side of said coupling member, the slots on one side of the coupling member being normal to those on the other side of the coupling member, and means for moving said coupling member into and out of axial alinement with said clutch members and said disc cranks to enable said coupling member to cause variation in the relative speed ratio between said clutch members.

6. In a gearless variable speed transmission, a pair of driving disc cranks, a pair of driven disc cranks similar to said driving disc cranks respectively, a clutch member cooperatively engaging said driving disc cranks, a similar clutch member cooperatively engaged by said driven disc cranks, an intermediate coupling member, one of said clutch members and its associated disc cranks located on one side of said coupling member and the other clutch member and its associated disc cranks located on the other side of said coupling member, means on said coupling member for engaging said driving and driven pairs of disc cranks respectively, said engaging means on said coupling member comprising a pair of radial channels on one side of said coupling member and another pair of radial channels on the other side of said coupling member, rollers carried by said disc cranks adapted to roll in said channels, the rollers on said driven disc cranks being located a shorter radial distance from the axis of said transmission than those of said driving disc cranks, and means for moving said coupling member into and out of axial alinement with said clutch members and said disc cranks to enable said coupling member to cause variation in the relative speed ratio between said clutch members.

7. In a gearless variable speed transmission, a driving shaft and a driven shaft in axial alinement, a pair of driving members, a second pair of driven members similar to said first mentioned driving members respectively, a clutch disc cooperatively engaging said driving members, said clutch disc connected with said driving shaft, a driven clutch disc cooperatively engaged by said second pair of driven members, said driven clutch disc connected with said driven shaft, said clutch discs and their respective members having cooperating engaging elements, an intermediate coupling member, one of said clutch discs and its associated members located on one side of said coupling member and the other clutch disc and its associated members located on the other side of said coupling member, means on said coupling member for engaging said driving and driven members respectively, said engaging means on said coupling member including a pair of radial slots in alinement with each other on one side of said coupling member and another pair of alined radial slots on the other side of said coupling member, the slots on one side of the coupling member being normal to those on the other side of the coupling member, rollers carried by said members adapted to roll in said slots, and means for moving said coupling member into and out of axial alinement with said clutch discs and members to enable said coupling member to cause variation in the relative speed ratio between said clutch discs.

8. In a gearless variable speed transmission including a driving shaft and a driven shaft in axial alinement, a pair of driving members, a pair of driven members, a clutch disc cooperatively engaging said first mentioned driving members, said clutch disc connected with said driving shaft, a clutch disc cooperatively engaged by said driven members, said second clutch disc connected with said driven shaft, said clutch discs and their respective members having cooperating engaging elements, an intermediate coupling member, one of said clutch discs and its associated members located on one side of said coupling member and the other clutch disc and its associated members located on the other side of said coupling member, means on said coupling member for engaging said first mentioned driving and second mentioned driven members respectively, said engaging means on said coupling member including a pair of radial channels in alinement with each other on one side of said coupling member and another similar pair of alined radial channels on the other side of said coupling member, rollers carried by said members adapted to roll in said channels, the rollers on said driven members being located a shorter radial distance from the axis of said shafts than those of said driving members, and means for moving said coupling members into and out of axial alinement with said clutch discs and members to enable said coupling member to cause variation in the relative speed ratio between said clutch discs.

9. In a gearless variable speed transmission, a pair of disc cranks, a second pair of disc cranks similar to said first mentioned disc cranks respectively, a clutch member cooperating with said first mentioned disc cranks, a second clutch member cooperating with said second pair of disc cranks, said clutch members and their respective disc cranks having cooperating engaging elements, an intermediate coupling member, one of said clutch members and its associated disc cranks located on one side of said coupling member and the other clutch member and its associated disc cranks located on the other side of said coupling member, means on said coupling member for engaging said first mentioned and second mentioned pairs of disc cranks respectively, means for moving said coupling member into and out of axial alinement with said clutch members and disc cranks, and a manually operated control for said last mentioned means.

10. In a gearless variable speed transmission, a driving shaft and a driven shaft, a pair of disc cranks, a second pair of driven disc cranks similar to said first mentioned disc cranks, a clutch member cooperatively engaging said first mentioned disc cranks, a driven clutch member cooperatively engaged by said driven disc cranks, said driven clutch member connected with said driven shaft, an intermediate coupling member, one of said clutch members and its associated disc cranks located on one side of said coupling member and the other clutch member and its associated disc cranks located on the other side of said coupling member, means on said coupling member for engaging said first mentioned and driven pairs of disc cranks respectively, means for moving said coupling member into and out of axial alinement with said clutch members and disc cranks, and an automatic control for said last mentioned means, said automatic control operating in response to the load on said driven shaft.

11. A gearless variable speed transmission comprising, a driving shaft and a driven shaft in axial alinement, a pair of driving disc cranks, a second pair of driven disc cranks similar to said driving disc cranks respectively, a clutch member cooperatively engaging said first mentioned driving disc cranks, said clutch member connected with said driving shaft, a similar clutch member cooperatively engaged by said second pair of disc cranks, said second clutch member connected with said driven shaft, said clutch members and their respective disc cranks having cooperating engaging elements, an intermediate coupling member, one of said clutch members and its associated disc cranks located on one side of said coupling member and the other clutch member and its associated disc cranks located on the other side of said coupling member, means on said coupling member for engaging said first mentioned driving and second mentioned driven pairs of disc cranks respectively, said engaging means on said coupling member comprising a pair of radial channels in alinement with each other on one side of said coupling member and another similar pair of alined radial channels on the other side of said coupling member, the channels on one side of the coupling member being normal to those on the other side of the coupling member, the channels on the side of the driven disc cranks being wider than those on the side of the driving disc cranks, rollers carried by said disc cranks adapted to roll in said channels, the rollers on said driven disc cranks being larger and located a shorter radial distance from the axis of said shafts than those of said driving disc cranks, and manually operated means for moving said coupling member into and out of axial alinement with said clutch members and said disc cranks to enable said coupling member to cause variation in the relative speed ratio between said clutch members.

FERDINAND W. SEECK.